(12) United States Patent
Wasko (10) Patent No.: US 8,966,375 B2
(45) Date of Patent: Feb. 24, 2015

(54) MANAGEMENT OF APPLICATION PROGRAMS ON A PORTABLE ELECTRONIC DEVICE

(75) Inventor: Timothy Wasko, High River (CA)

(73) Assignee: Apple Inc., Cupertino, CA (US)

( * ) Notice: Subject to any disclaimer, the term of this patent is extended or adjusted under 35 U.S.C. 154(b) by 887 days.

(21) Appl. No.: 12/554,945

(22) Filed: Sep. 7, 2009

(65) Prior Publication Data

US 2011/0061010 A1   Mar. 10, 2011

(51) Int. Cl.
| | | |
|---|---|---|
| G06F 3/00 | (2006.01) | |
| G06F 3/0482 | (2013.01) | |
| G06F 3/06 | (2006.01) | |
| G06F 3/14 | (2006.01) | |
| G06F 3/0481 | (2013.01) | |
| G06F 3/0486 | (2013.01) | |
| G06F 9/44 | (2006.01) | |

(52) U.S. Cl.
CPC .............. *G06F 3/0482* (2013.01); *G06F 3/065* (2013.01); *G06F 3/1454* (2013.01); *G06F 3/04817* (2013.01); *G06F 3/0486* (2013.01); *G06F 9/4443* (2013.01)
USPC .......................................... 715/740; 715/748

(58) Field of Classification Search
USPC .................................................. 715/778, 740
See application file for complete search history.

(56) References Cited

U.S. PATENT DOCUMENTS

| | | | | |
|---|---|---|---|---|
| 5,841,435 A | * | 11/1998 | Dauerer et al. ............... | 715/775 |
| 6,687,878 B1 | * | 2/2004 | Eintracht et al. ............. | 715/201 |
| 7,987,432 B1 | * | 7/2011 | Grechishkin et al. ......... | 715/778 |
| 2003/0189597 A1 | * | 10/2003 | Anderson et al. ............. | 345/778 |
| 2004/0070608 A1 | * | 4/2004 | Saka ............................. | 345/748 |
| 2004/0174398 A1 | * | 9/2004 | Luke et al. .................... | 345/856 |
| 2006/0136835 A1 | * | 6/2006 | Hochmuth et al. ........... | 715/779 |
| 2007/0124737 A1 | * | 5/2007 | Wensley et al. ............... | 719/314 |
| 2007/0150810 A1 | * | 6/2007 | Katz et al. ..................... | 715/526 |
| 2007/0271522 A1 | * | 11/2007 | Son et al. ...................... | 715/762 |
| 2008/0182628 A1 | * | 7/2008 | Lee et al. ....................... | 455/566 |
| 2008/0248834 A1 | * | 10/2008 | Chatterjee et al. ............ | 455/557 |
| 2009/0055758 A1 | * | 2/2009 | Sim et al. ...................... | 715/762 |
| 2009/0083655 A1 | * | 3/2009 | Beharie et al. ................ | 715/781 |
| 2009/0150831 A1 | * | 6/2009 | Young et al. .................. | 715/845 |
| 2009/0282352 A1 | * | 11/2009 | Solanki et al. ................ | 715/765 |
| 2010/0070931 A1 | * | 3/2010 | Nichols ......................... | 715/863 |
| 2010/0223563 A1 | * | 9/2010 | Green ............................ | 715/762 |
| 2011/0145327 A1 | * | 6/2011 | Stewart ......................... | 709/203 |
| 2013/0125017 A1 | * | 5/2013 | Kaghazian .................... | 715/748 |

* cited by examiner

*Primary Examiner* — Matt Kim
*Assistant Examiner* — Ryan Barrett
(74) *Attorney, Agent, or Firm* — Park, Vaughan, Fleming & Dowler LLP (57) ABSTRACT

A method, system, and graphical user interface (GUI) for management of application programs on a portable electronic device (PED) is discussed. A management application program operating on a computing device can provide management of the application programs on the PED by presenting a GUI. The user can interact with the GUI to (i) manage (e.g., position applications, arrange applications, add applications, and the like) the application programs, and (ii) arrange application icons on the PED.

29 Claims, 10 Drawing Sheets

MANAGEMENT OF APPLICATION PROGRAMS ON A PORTABLE ELECTRONIC DEVICE

FIELD OF INVENTION

The present invention relates to portable electronic devices. More particularly, the present invention relates to the management of application programs on portable electronic devices.

BACKGROUND OF INVENTION

The management (e.g. position the applications, arrange the applications, addition of applications, and the like) of application programs for a computing device have been based on a user's preferences. However, the user's preference are limited to that particular computing device. If the computing device has a small display screen, the user may find it difficult to manage application programs. For example, if there are many application icons on the computing device, it can be awkward and frustrating for the user to manage the applications since the size of the display screen on the device is small and the images on the display screen may be difficult to see. Additionally, the user may have to flip through many pages or display screens on the device to find the application program, which is inefficient and may be frustrating for the user.

Furthermore, if a user loses the computing device and/or replaces the device, such as a mobile telephone, the user must again manually obtain and manage the application program in accordance with a user's preferences. For example, the user may need to reorder or obtain application icons from a media management application, such as iTunes. However, when the application icons are transferred from iTunes to the device, the application icons are arranged in a random and unorganized manner on the device. The user must then take time to reorder and organize the application icons, which is time consuming and inefficient.

SUMMARY

A method, system, and graphical user interface (GUI) for management of application programs on a portable electronic device (PED) is discussed. A management application program operating on a computing device can provide management of the application programs on the PED by presenting a GUI. The user can interact with the GUI to (i) manage (e.g., position applications, arrange applications, add applications, and the like) the application programs, and (ii) arrange application icons on the PED.

In one embodiment, a computer implemented method may include receiving, at a computing device, a device data set, the device data set including device application data to identify a plurality of application programs provided in the PED and arrangement data for the plurality of application programs provided in the PED. A visual representation of a display screen for the PED may be displayed on a display device associated with the computing device, the visual representation including an application icon for each of at least a first set of the plurality of application programs provided in the PED, with the application icons arranged in the visual representation in accordance with the arrangement data. The user of the computing device may be permitted to interact with the visual representation to alter an arrangement of one or more of the application icons within the visual representation and the PED may be notified of the altered arrangement such that the PED is able to alter its arrangement of the one or more of the plurality of application programs provided on the PED in accordance with the altered arrangement.

In another embodiment, a GUI for a for a display of a computing device may have a first portion configured to display a plurality of display screens, each of the plurality of display screens including a plurality of application icons, wherein each of the plurality of display screens represents a corresponding display screen of a portable electronic device (PED) and wherein each of the plurality of application icons represent a corresponding application program stored on the PED. A second portion may be configured to display one of the plurality of display screens from the first portion, and a third portion configured to display a list of user selectable applications that are resident on the computing device, wherein a user can select at least one of the user selectable applications to be transferred to the PED, and wherein each of the user selectable applications include a corresponding application icon.

In still another embodiment, a computer-implemented method to manage a plurality of applications on a PED using a computing device may include receiving a device data set from the PED to the computing device, the device data set including a plurality of display screens, each of the plurality of display screens including an application icon for each of the plurality of application programs associated with that page, with each of the plurality of application programs designated by the display screens being stored on the PED. The plurality of display screens received from the PED may be presented on a first portion of a graphical user interface (GUI) of the computing device, a selected one of the plurality of display screens from the first portion may be displayed on a second portion of the GUI, the selected display screen including a plurality of application icons. The method further includes presenting at least one user selectable application usable on the portable electronic device on a third portion of the GUI, wherein at least one of the user selectable application is not previously associated with one of the plurality of application icons from the first portion, selecting at least one application icon associated with the user selectable applications not previously associated with one of the plurality of application icons from the first portion, and selecting a display screen from the first portion to insert the at least one selected icon, wherein the selected display screen is automatically displayed on the second portion. The at least one selected icon may be inserted on the selected display screen at a position selected by a user and subsequently transferring information concerning the plurality of display screens from the computing device to the portable electronic device, the information including at least position information for each of the application icons on each of the plurality of display screens during the downloading.

In another embodiment, a computer readable medium including at least computer program code stored thereon for arranging program icons on a PED, the computer readable medium may include computer program code for receiving, at a computing device, a device data set, the device data set including device application data to identify a plurality of application programs provided in the PED and arrangement data for the plurality of application programs provided in the PED and computer program code for displaying, on a display device associated with the computing device, a visual representation of a display screen for the PED, the visual representation including an application icon for each of at least a first set of the plurality of application programs provided in the PED, with the application icons arranged in the visual representation in accordance with the arrangement data. The computer readable medium may also include computer program code for permitting the user of the computing device to interact with the visual representation to alter an arrangement of one or more of the application icons within the visual representation, and computer program code for notifying the PED of the altered arrangement.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

A method, system, and graphical user interface (GUI) for management of application programs on a portable electronic device (PED) is discussed. A management application program operating on a computing device can provide management of the application programs on the PED by presenting a GUI. The user can interact with the GUI to (i) manage (e.g. position the applications, arrange the applications, add applications, and the like) the application programs, and (ii) arrangement of application icons on the PED.

Figure 1:
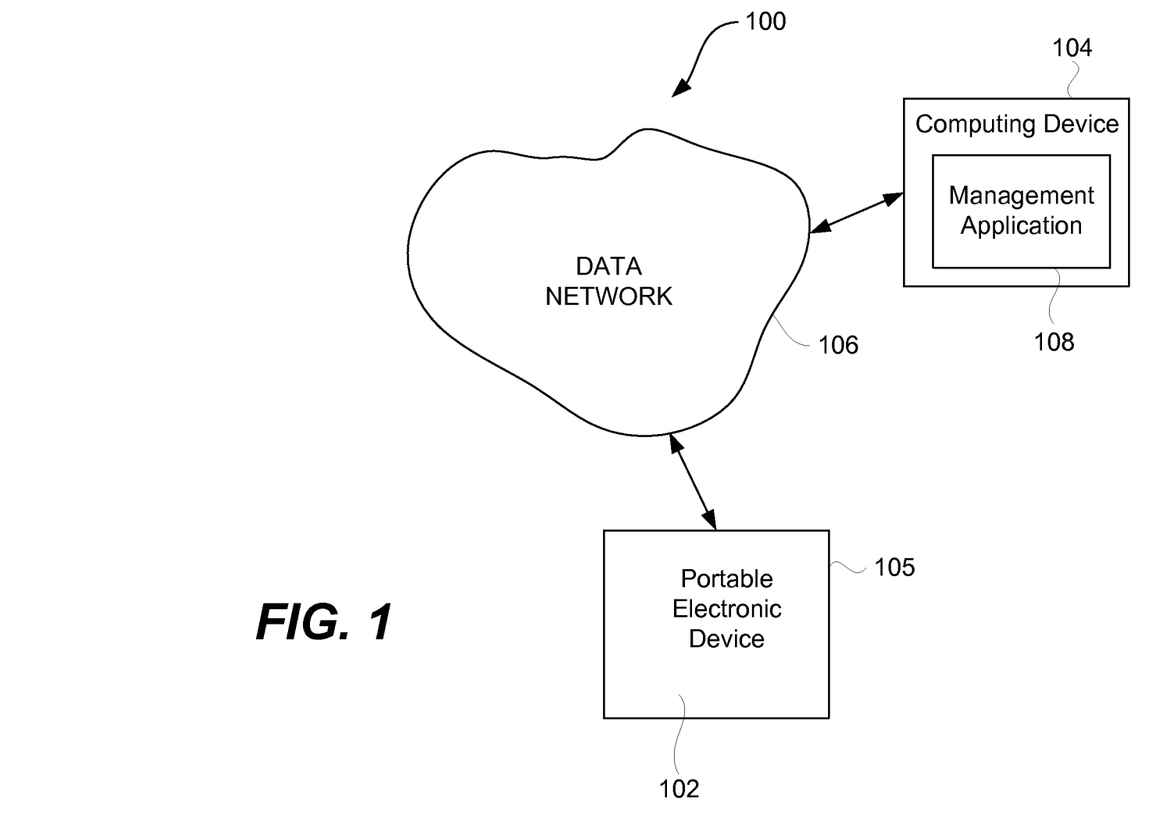
FIG. 1 illustrates an example block diagram of a program application management system for a portable electronic device.

FIG. 1 illustrates an example block diagram of an application program management system for a portable electronic device. The application program management system 100 includes a PED 102 that may be any portable electronic device, such as a handheld portable electronic device. Examples of PEDs 102 may be portable media players, mobile telephones, personal digital assistants (PDAs), and the like. The PED 102 may be configured to receive and store a plurality of application programs that run on the PED 102. The PED 102 may also be configured to communicate with a computing device 104, such as a personal computer, or the like. The PED 102 may communicate with the computing device 104 via any wireless or wired means. In one implementation, the PED 102 can be connected to the computing device 104 over a cable. As an example, the cable can pertain to a peripheral bus such as a USB or Firewire® (IEEE-1394) connection. In another implementation, the PED 102 can connect to the computing device 104 over a wireless connection or data network 106 (e.g., infrared, Bluetooth®, WiFi, or WiMax).

A management application program 108 may operate on the computing device 104 to facilitate management of application programs on the PED 102. The management application program 108 may operate to facilitate the arrangement or re-arrangement of new or existing application programs on the PED 102. The management application program 108 may also operate to facilitate addition or removal of application programs with respect to the PED 102. The management application program typically allows the user to view, browse and/or search application programs on the PED 102 using the GUI on the computing device 104, to add application programs to the PED 102, and/or to remove application programs from the PED 102.

When in communication with the computing device 104, the computing device 104 may receive a device data set from the PED 102. The device data set may include application data to identify the plurality of application programs on the PED 102 and associated application icons for each of the application programs. The device data set may also include arrangement data for the arrangement or positioning of each of the plurality of application icons for the application programs on each display screen of the PED 102.

The computing device 104 may display a visual representation of a display screen of the PED 102. The visual representation may have application icons for at least a first set of the plurality of application programs provided on the PED 102. The user may then interact with the visual representation to alter the arrangement of one or more of the plurality of application programs provided on the PED as described in detail below in FIGS. 2A-2D.

Figure 2A:
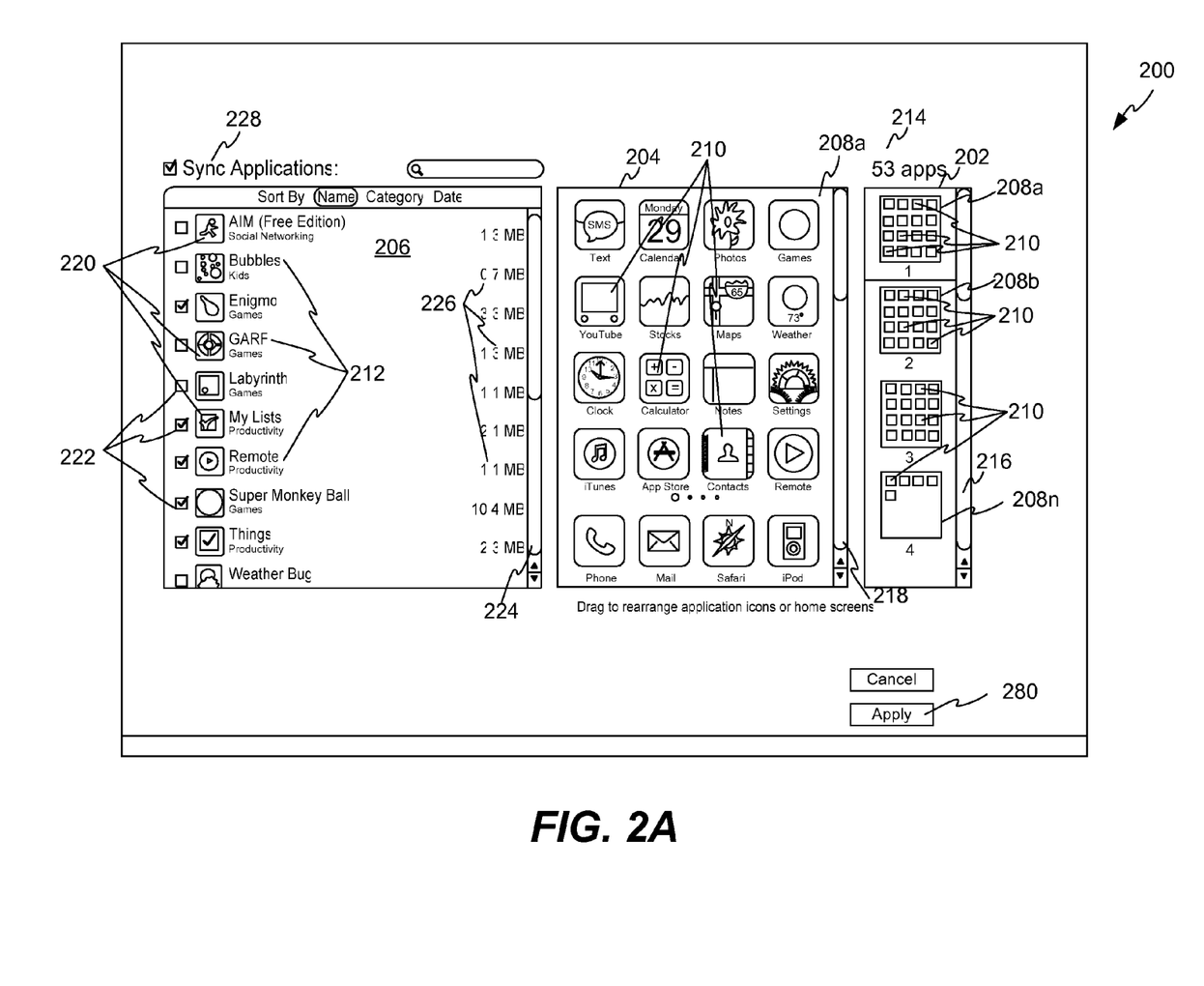
FIGS. 2A-2D illustrate example graphical user interfaces on a computing device.

FIGS. 2A-2D illustrate example graphical user interfaces on a computing device. Referring to FIG. 2A, the GUI 200 may be presented on a display of a computing device, such as the computing device 104 discussed above with reference to FIG. 1. The GUI 200 may have a first portion 202 configured to display a plurality of pages 208a-n (where n is an integer), each of the plurality of pages 208a-n including a plurality of application icons 210. Each of the plurality of pages 208a-n represents a corresponding page on the PED. The pages 208a-n represent display screens of the PED. Additionally, each of the plurality of application icons 210 represent a corresponding application program stored on the PED.

The first portion 202 may have a user scroll control 216 to allow the user to navigate each of the plurality of pages 208a-n. Although the first portion 202 and user scroll control 216 are illustrated in a vertical placement, this is not intended to be limiting as the first portion 202 and user scroll control 216 may be positioned in any direction, such as horizontally, diagonally, and the like on the GUI 200. In another embodiment, the first portion may not have a visible user scroll control 216. Rather, the display of the computing device may be a touch screen display to allow the user to manually swipe, scroll or flip through the plurality of pages using hand gestures.

The number of application programs 214 stored on the PED may be displayed on the first portion 202. However, this is not intended to be limiting as the number of application programs 214 may be displayed in any location on the GUI 200. The number of application programs 214 may dynamically and automatically change as application program icons 210 are inserted and/or removed from first portion 202 or second portion 204.

A second portion 204 may be configured to display one of the plurality of pages 208a-n from the first portion 202, including the plurality of application icons 210. As shown in FIG. 2A, the page 208a is displayed on the second portion 204. In one embodiment, the second portion 204 can be substantially larger than the first portion 202. In another embodiment, the page 208a displayed on the second portion 204 can be presented at a size that substantially corresponds to the size of the corresponding page 208a on the PED. The second portion 204 may also have a user scroll control 218 to allow the user to navigate each of the plurality of application icons 210 on each of the plurality of pages 208a-n presented in the first portion 202. Although the user scroll control 218 is illustrated in a vertical placement, this is not intended to be limiting as the user scroll control 218 may be positioned in any direction, such as horizontally on the bottom of the second portion 204. Each of the plurality of pages 208a-n, presented on the first portion 202, may be navigated in a horizontal manner if the user scroll control 218 is positioned at the bottom of the second portion 204. In another embodiment, the second portion may not have a visible user scroll control 218. User input can be provided with a user pointing device, such as a mouse. Alternatively, the display of the computing device may be a touch screen display to allow user input (e.g., manually swipe, scroll or flip through the plurality of pages using gestures).

A third portion 206 may be configured to display a list of user selectable applications 212 that are resident on the computing device. The amount of space or memory 226 required to download each of the user selectable applications 212 to the PED may also be presented on the third portion 206. Each of the user selectable applications 212 may be associated with a corresponding application icon 220. The user can select at least one of the user selectable applications 212 to be copied to or removed from the PED. In one embodiment, at least one of the user selectable applications 212 listed on the GUI 200 may not be previously associated with one of the application icons 210 presented on the first portion 202 or the second portion 204.

The third portion 206 may also display one or more selection indicators 222 (or interest indicators). The user may check the selection indicator 222 to identify at least one of the user selectable applications 212 that is of interest to the user. In one embodiment, the selection indicator 222 (or interest indicator) may automatically be checked or marked if the application program is stored on the PED. Thus, if the user would like to remove an existing program application, he can uncheck or unmark the selection indicator 222. To add onto the PED an application program that is not currently on the PED, the user can check the selection indicator 222 corresponding to the application program to be added.

A user scroll control 224 may be used to allow the user to navigate the list of user selectable applications. Although the user scroll control 224 is illustrated in a vertical placement, this is not intended to be limiting as the user scroll control 224 may be positioned in any direction, such as horizontally to allow the user to navigate the list of user selectable applications in a horizontal manner. In another embodiment, the third portion 206 may not have a visible user scroll control 224. User input can be provided with a user pointing device, such as a mouse. Alternatively, the display of the computing device may be a touch screen display to allow user input (e.g., manually swipe, scroll or flip through the plurality of user selectable applications 212 using gestures).

In use, a user may select at least one of the user selectable applications 212. In one embodiment, the user may select or unselect the user selectable applications 212 via the selection indicator 222. Once selected, the user may then select (e.g., click on) the "Sync Application" control 228. The corresponding or associated application icons 220 for the user selectable applications 212 that have been selected may be automatically removed or inserted into at least one page 208a-n displayed in the second portion 204 and the first portion 202. The selected application icons 220 (corresponding to the user selectable application 216 that have been selected) may be inserted in any manner desired based upon pre-defined priority instructions. For example, the selected application icons 220 may be inserted into a position at the beginning of the first page 208a. In another example, the selected application icons 220 may be inserted into open positions on the last page 208n. In another example, each selected application icon may be inserted in alphabetical order on each of the plurality of pages 208a-n. Any existing application icons may be shifted to a new position to accommodate any of the added application icons, if necessary. In still another example, the selected application icons may be inserted based upon the amount of use, date of last use, or any other pre-defined priority criterion. The pre-defined priority criterion may be user-defined instructions.

In another embodiment, the user may drag and drop a selected application icon 220 associated with one of the user selectable applications 212. In one embodiment, the user may select and then drag-and-drop the desired application icon 220 into the page 208a displayed on the second portion 204. In another embodiment, the user may select and then drag-and-drop the desired application icon 220 into one of the pages 208a-n displayed on the first portion 202. In this embodiment, the selected page that the application icon 220 is added to may be spring loaded to the second portion 204 of the GUI 200 and displayed to the user as further illustrated and discussed in FIG. 2C.

Figure 2B:
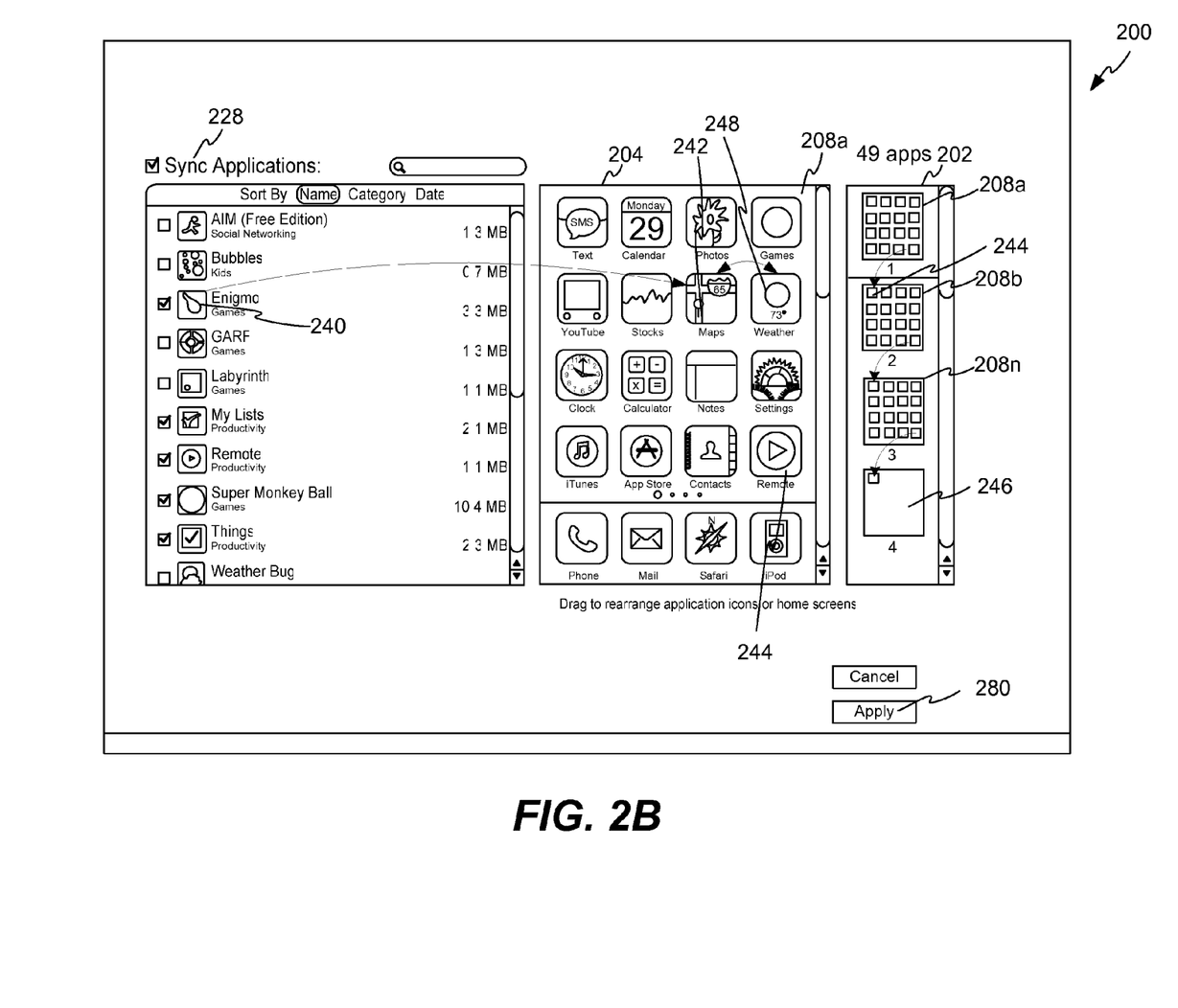

Referring now to FIG. 2B, all positions on page 208a are occupied since all the positions for application icons on the page 208a already contain an application icon 210. Thus, when a selected application icon 220 is inserted or dragged-and-dropped into one of the occupied positions for application icons on page 208a, one or more of the existing application icons 210 on the page 208a can shift to a new position. In other words, if the selected application icon 220 is to be placed in an occupied position, any existing application icons 210 on the page 208a may be shifted to accommodate the selected application icon 220 being added.

As illustrated in FIG. 2B, a user may drag-and-drop the "Enigmo" icon 240 to a position occupied by the "Maps" icon 242. Therefore, the "Maps" icon 242 and all the existing application icons succeeding the "Maps" icon 242 on the page 208a may need to shift to a new position. For example, the "Maps" icon 242 may be shifted to the position previously occupied by the "Weather" icon 248. This would cause the "Remote" icon 244 to shift to the beginning of page 208b, as illustrated in the first portion 202.

In one embodiment, a new page 208n may also be inserted after a last page displayed on the first portion 202, if necessary. As illustrated in FIG. 2B, the addition of the "Enigmo" icon 240 required the addition of new page 246 to accommodate the existing application icons 210 which were shifted. Thus, a new page 246 may be inserted after the last page 208n displayed on the first portion 202 to accommodate the shifted application icons subsequent to the insertion of the selected application icon 220, namely, the "Enigmo" icon 240, on page 208a displayed on the second portion 204, if necessary.

Figure 2C:
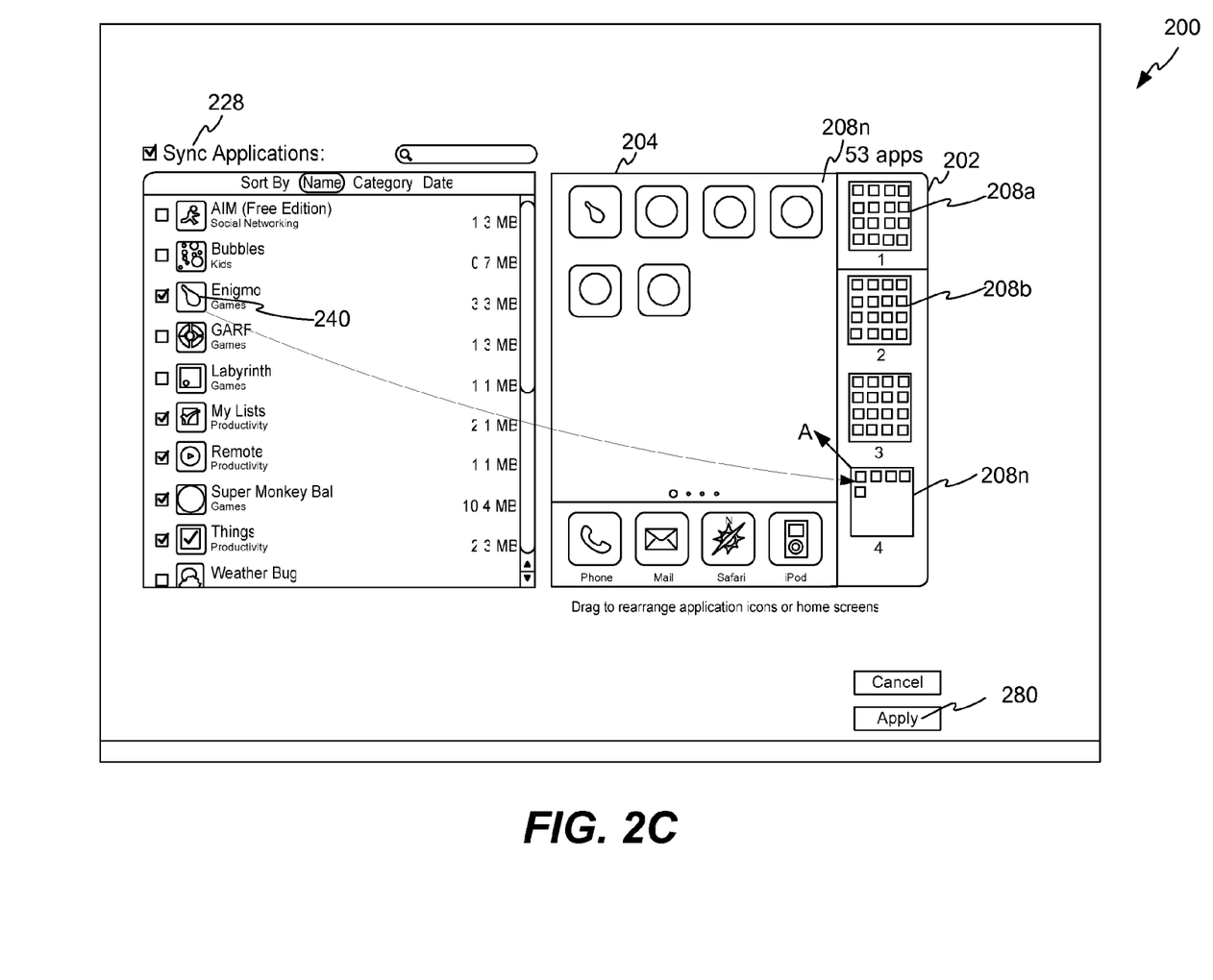

As illustrated in FIG. 2C, the user may select and then drag-and-drop the desired application icon 220 onto one of the pages 208a-n displayed on the first portion 202. In this embodiment, the selected page that the selected application icon 220 is added to may transition to the second portion 204 of the GUI 200. The transition can, in effect, cause the selected page to become the page associated with the second portion 204. In one implementation the second portion is "spring loaded" so that it can "spring" into the second portion 204 to facilitate user interaction with the selected page. In this example, as illustrated, the user can then drag-and-drop the "Enigmo" icon 240 to a position on page 208n presented on the first portion 202. In response, the page 208n may then transition (e.g., "spring") to the second portion 204 as indicated by arrow A such that the page 208n is loaded and displayed on the second portion 204 of the GUI 200.

Figure 2D:
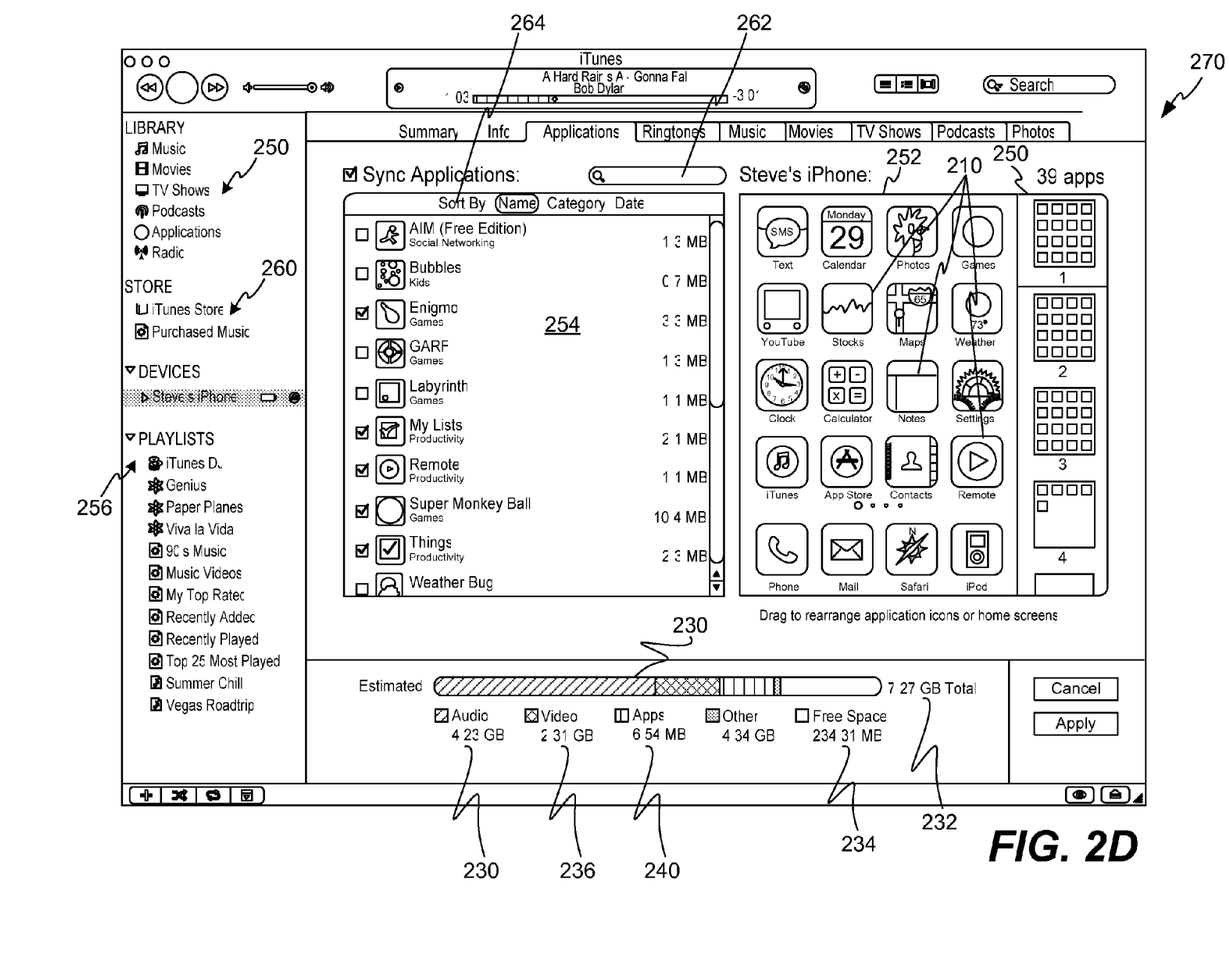

FIG. 2D illustrates another example GUI on the computing device. The GUI 270 may have a first portion 250, a second portion 252, and a third portion 254 as discussed above. However, the computing device may also have a media management application (MMA) or other media player application. One example of a media management application is the iTunes® application, produced by Apple Computer, Inc. of Cupertino, Calif. The MMA can be used by a consumer for a variety of purposes, including, but not limited to: (i) browsing, pre-ordering and/or purchasing media assets from an on-line media store, such as the iTunes tore 260, (ii) creating and sharing media asset groups (e.g., playlists 256), (iii) organizing media assets 258, (iv) presenting/playing media assets, and (v) playing media assets on the computing device.

The user may also be able to sort and search for a specific application icon and/or user selectable application using a search feature 262 on the GUI 270. A user may have many application icons on the PED. Thus, rather than having to look through all the pages and/or scroll through the list of user selectable application list, the sort feature 264 and/or the search feature 262 provides a user-friendly and efficient method to locate specific application icons and/or user selectable application.

The GUI 200 may also have a capacity bar 230 to inform the user of how many user selectable applications are and/or may be stored on the PED. The capacity bar 230 may include property information of the application programs stored on the PED. For example, the capacity bar 230 may include information on the amount of storage capacity 232 used on the PED, the amount of free space 234 on the PED, the amount of video files 236, the amount of audio files 238, the amount of application software 240 stored on the PED, and or similar information. The amounts provided on the capacity bar 230 may dynamically and automatically change as the user inserts and/or removes application icons 210 from the first portion 250 or the second portion 252 of the GUI 270.

Figure 3:
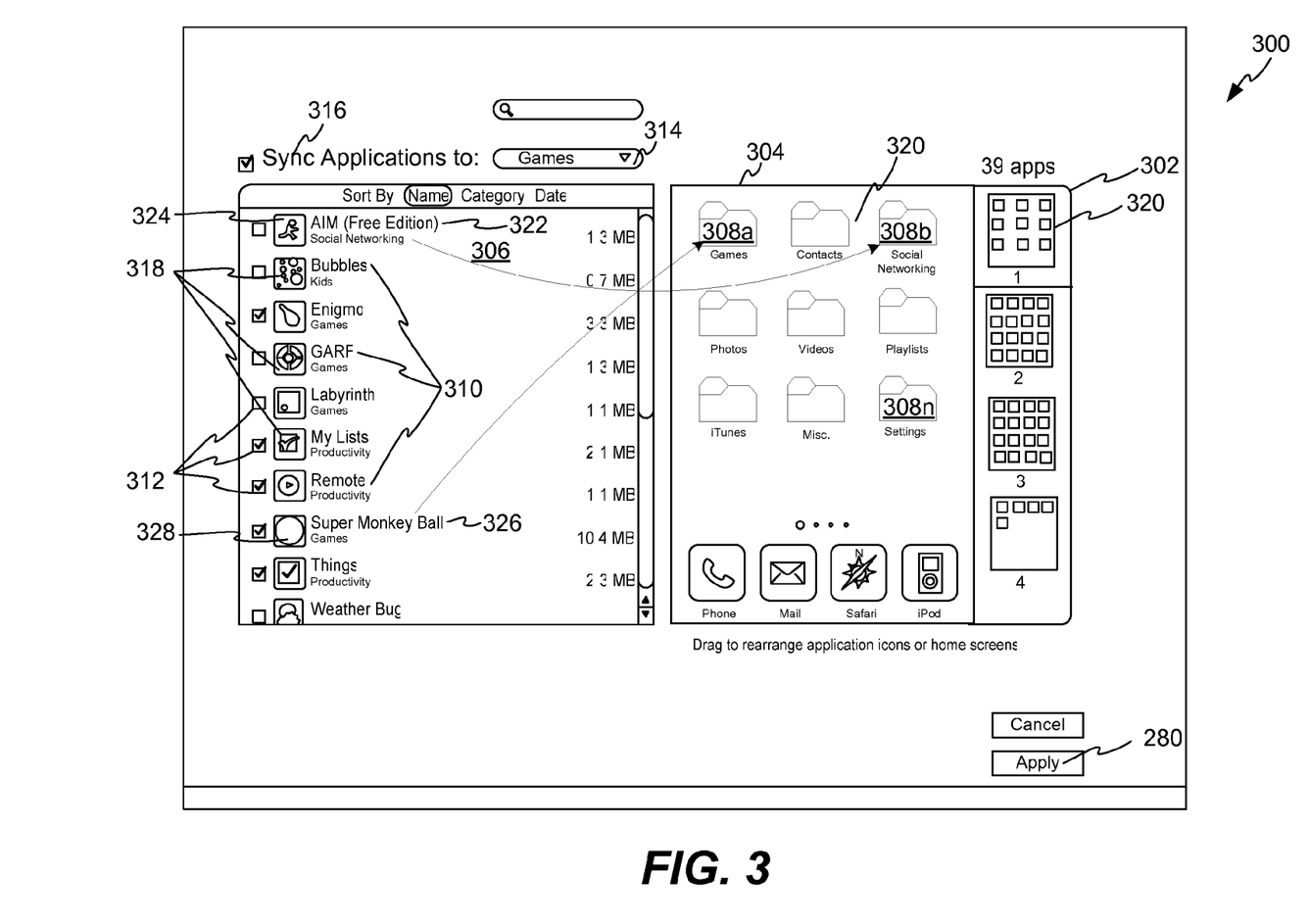
FIG. 3 illustrates another example graphical user interface on a computing device.

FIG. 3 illustrates another example graphical user interface on a computing device. The GUI 300 may have a first portion 302, a second portion 304, and a third portion 306 similar to the first, second, and third portions as discussed above with reference to FIGS. 2A-2D. However, one of the pages 320 may have a plurality of folders 308a, 308b, 308n. The folders 308a-n may be personalized or preset folders to allow the user to better organize each of the application programs stored on the PED.

In one example, the user may select or de-select the user selectable applications 310 via the interest indicator 312. Once selected, the user may select a folder 314 to sync the selected user selectable applications to, click the "Sync Applications To" control 316, and each of the application icons 318 for the selected user selectable applications 310 may be automatically inserted into the selected folder 308a-n in the second portion 304.

Within the folder 308a-n, the selected application icons 318 may be inserted in any manner desired. For example, the selected application icons may be inserted in alphabetical order, at the beginning of the application program list in the selected folder, at the end of the application program list in the selected folder, or in any other manner desired as discussed above.

In another embodiment, the user may drag and drop a selected application icon 318 associated with the interested user selectable application 310. In one embodiment, the user may select and drag-and-drop the desired application icon 318 into a folder 308a-n displayed on the second portion 304.

Figure 4:
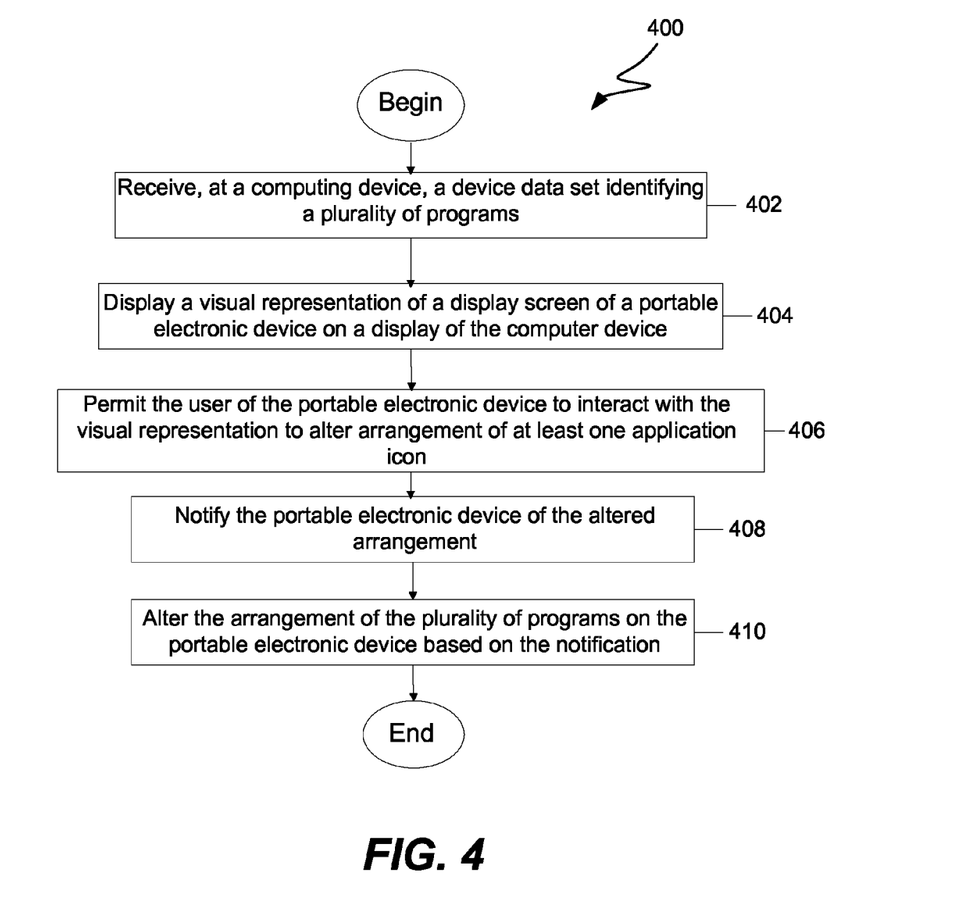
FIG. 4 illustrates a flow diagram of a method for managing a plurality of applications on a portable electronic device using a computing device.

For example, the user may be interested in adding the "AIM" 322 user selectable application to the PED. To better organize the applications on the PED, the user can drag-and-drop the corresponding "AIM" application icon 324 into the "Social Networking" folder 308b. In another example, the user may be interested in adding "Super Monkey Ball" 326 to the PED. To better organize the applications on the PED, the user can drag-and-drop the corresponding "Super Monkey Ball" application icon 328 into the "Games" folder 308a FIG. 4 illustrates a flow diagram of a method for managing a plurality of applications on a portable electronic device using a computing device. The method for managing a plurality of applications on a PED using a computing device 400 begins with the computing device receiving a device data set identifying a plurality of programs at 402. The plurality of programs are those application programs currently resident or stored on the PED and usable by the PED. The device data set may include information or data identifying application programs stored on the PED as well as associated application icons for each of the application programs. The device data set may also include arrangement data for each of the application icons on the PED. The arrangement data can designate a page (e.g. display screens of the PED) and position on the page (e.g. display screen of the PED) for each of the application programs.

A visual representation of a display screen of the PED may be displayed on a display of the computing device at 404. The visual representation may display an application icon for each of the plurality of application programs stored on the PED based upon the device data set received from the PED. The visual representation may, for example, be displayed as discussed in detail above with reference to FIGS. 2A-2D.

The user of the PED may be permitted to interact with the visual representation to alter the arrangement of at least one application icon presented in the visual representation at 406. For example, through manipulation of the application icons presented in the visual representation, the application icons for applications on the PED can be rearranged on a single page (display screen) or across multiple pages (display screens). The visual representation may also display a list of the application programs usable on the PED. At least one of the application programs may not be associated with the device data set received from the PED at 402. In other words, at least one of the application programs are not already stored on the PED. The user may interact with the visual representation to add application programs and/or remove application programs as discussed above with reference to FIGS. 2A-2D. For example, the user may select application programs to be inserted into the visual representation. In another example, the user may drag-and-drop the application program icon into the visual representation.

The visual representation may be dynamically updated as the user interacts with the visual representation so the user may immediately see the application icons displayed on the visual representation. This may provide the user with an efficient and user-friendly way to manage (e.g. position the application icons, arrange the application icons, add application icons, and the like) the application programs that are on the PED.

The computing device may then notify the PED of the altered arrangement of the application icons at 408. For example, a replacement device data set (or updated data set) may be sent to the PED one the user selects the "Apply" button 280 illustrated in FIG. 2A-2D and FIG. 3. In one embodiment, if the PED may not be in communication with the computing device. Thus, the replacement data set may be transmitted to the PED once it is determined that the PED is in communication with the computing device.

The replacement device data set may include device application data to identify application programs to be removed or added on the PED and the associated application icon for each of the application programs. The replacement device data set may also include arrangement data for each of the program icons provided on the PED. The arrangement of the program icons on the PED may then be altered based on the notification at 410 in the same manner and/or position as it was altered on the computing device. This may ensure that the arrangement of the application icons, as arranged by the user using the visual representation, is preserved when sent or transmitted to the PED. To the extent a new application icon is to be added to the visual representation of the PED, the application program data can also be sent or transmitted to the PED. If an existing application icon is to be removed from the visual representation of the PED, the application program data can also be removed from the PED.

The arrangement of the application icons and the application programs may be stored or saved at the computing device. For example, the replacement device data set may be stored, i.e., archived, on the computing device so that the application programs and the arrangement of the application icons for a PED can be maintained. Hence, if the PED loses its application or arrangement data for application programs, the PED could be connected to the computing device and the stored replacement data set could be accessed and used to return the PED to its archived state. Similarly, if the user obtains another PED (new, additional or associated with a common user account), the another PED could be connected to the computing device and the stored replacement data set could be accessed and used to conform the other PED to a previously saved archived state.

Figure 5A:
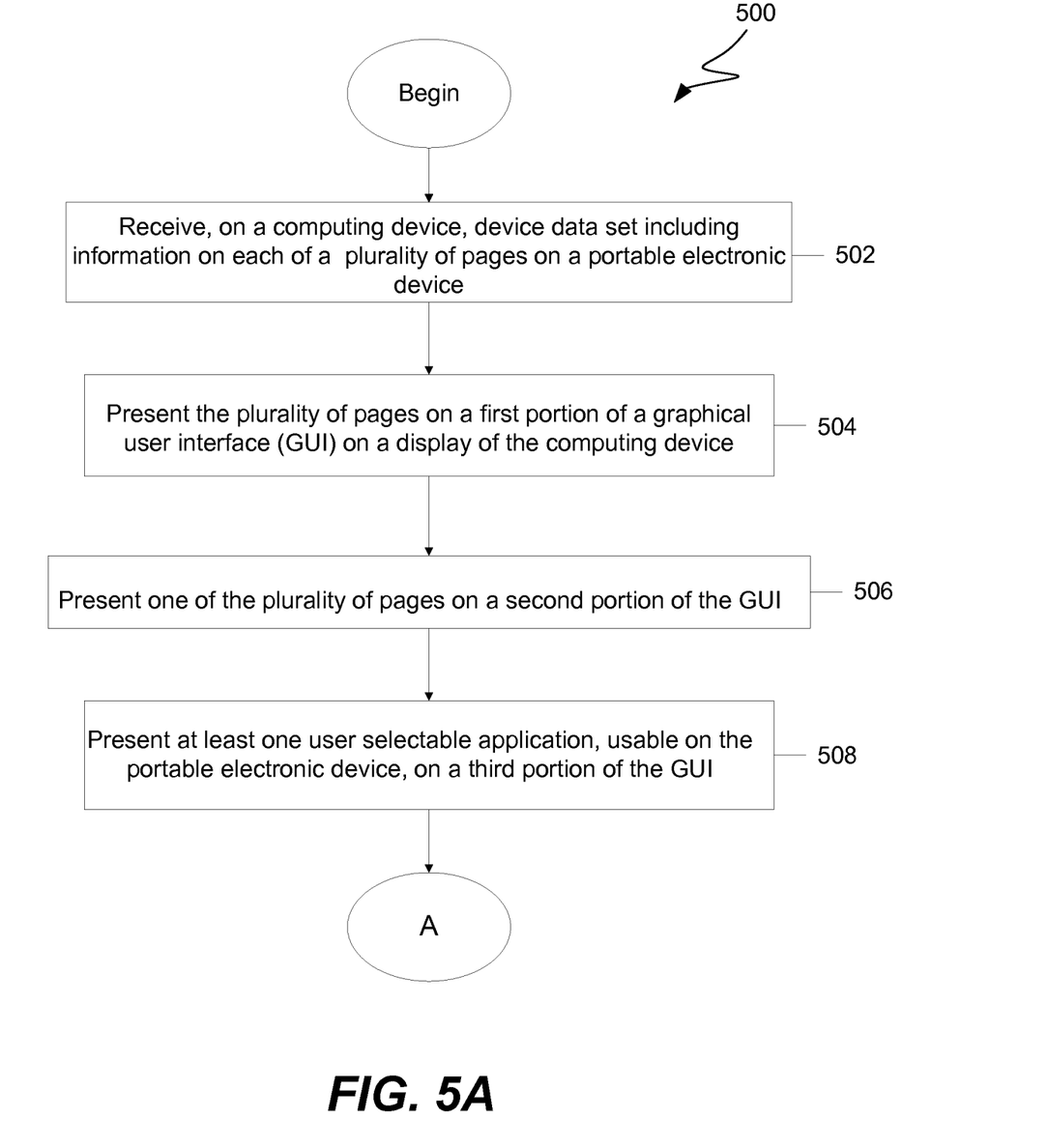
FIGS. 5A-5C illustrate another example flow diagram of a method for managing a plurality of applications on a portable electronic device using a computing device.
Figure 5B:
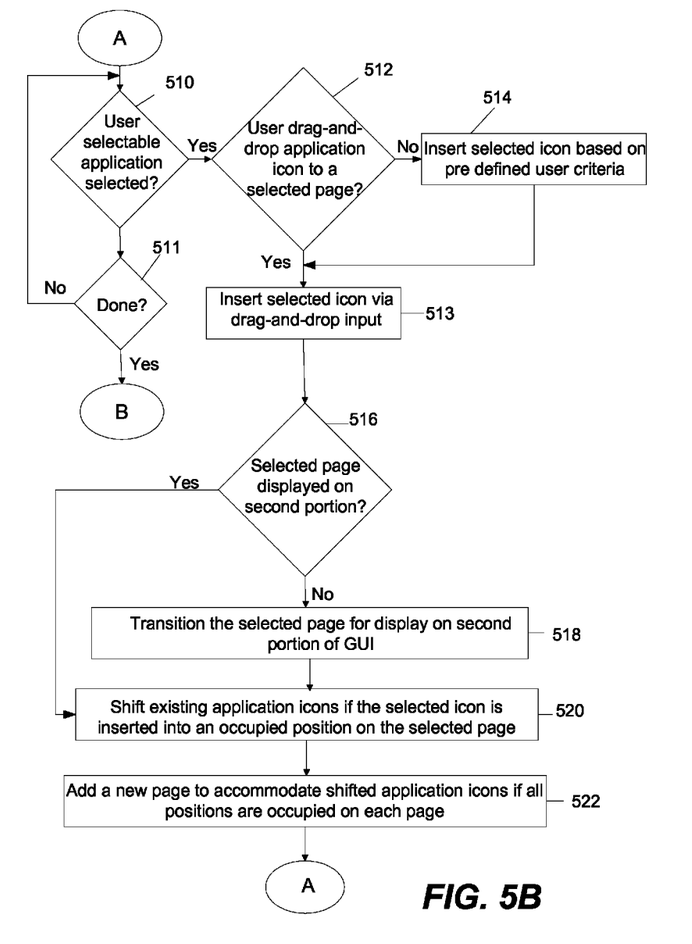
Figure 5C:
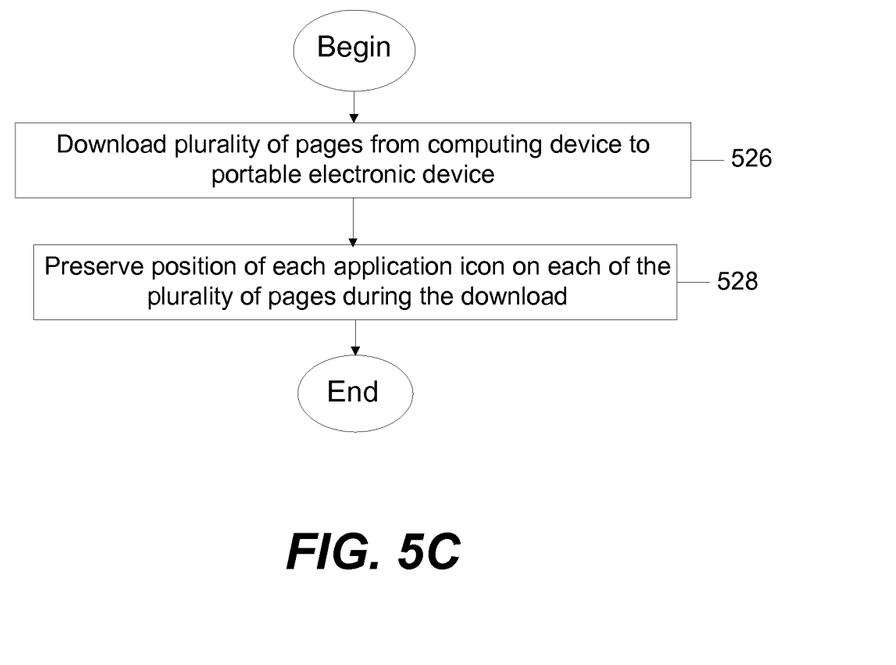

FIGS. 5A-5C illustrate another example flow diagram of a method 500 for managing a plurality of applications on a portable electronic device using a computing device. Referring to FIG. 5A, the method 500 for managing a plurality of applications on a portable electronic device using a computing device begins with the computing device receiving a device data set including information on each of a plurality of pages (e.g., display screens) on a PED at 502. The plurality of pages are then presented on a first portion of a GUI on a display of the computing device at 504 based on the data provided in the device data set. The plurality of pages may display an application icon for each application program stored on the PED. Each page displays an application icon for each of the application programs operated on the PED that are designated as being associated with that page.

One of the plurality of pages presented on the first portion of the GUI may be presented on a second portion of the GUI at 506. The page may also display the corresponding application icons associated with the page. In one embodiment, the second portion of the GUI may be substantially larger than the first portion. In another embodiment, the page displayed on the second portion of the GUI can correspond to the size of the corresponding page on the PED.

Additionally, at least one user selectable application, that is usable on the PED, can be presented on a third portion of the GUI at 508. In one embodiment, the user selectable applications can be presented in a list. Typically, at least one of the user selectable applications is not previously associated with one of the application icons from the first portion.

Referring to FIG. 5B, a determination is made whether a user selected a user selectable application at 510. In one embodiment, the computing device may be configured to detect an input whereby the user uses a selection indicator to identify at least one of the user selectable applications to be provided to the PED. In another embodiment, the computing device may be configured to detect an input whereby the user selects and then drag-and-drops an application icon corresponding to the selected user selectable application. If no selection is made at 510, a decision at 511 can determine whether user alterations via the method 500 are done. If the method 500 is not to done, the processing returns to the decision 510. Alternatively, if the method 500 is done, the method 500 can proceed to block 526 as illustrated in FIG. 5C.

On the other hand, if a user selectable application is selected at 510, a determination is made whether the user dragged-and-dropped the corresponding application icon to a selected page at 512. If the user did drag-and-drop the application icon at 512, the selected user selectable application may be inserted into at least one page displayed on the GUI based on the drag-and-drop input at 513. Alternatively, if the user did not drag-and-drop the application icon at 512, the selected user selectable application may be inserted into at least one page displayed on the GUI based on predefined criteria at 514. For example, the predefined criteria may be to insert the one or more selected application icons into a position at the beginning of a first page. In another example, the one or more selected application icons may be inserted into open positions on the last page. In another example, the one or more selected application icon may be interested in alphabetical order. The existing application icons may shift to a new position to accommodate the added application icon.

Following the blocks 513 and 514, a determination is made whether the selected page is displayed on the second portion of the GUI at 516. If the selected page is not displayed on the second portion of the GUI at 516, the selected page is presently not displayed on the second portion and thus may be dynamically and automatically transitioned so that the selected page is displayed on the second portion of the GUI at 518. The transitioning to display the selected page in the second portion can be performed in a spring loaded manner, whereby the selected page "springs" from its position in the first portion to the second portion.

Once the selected page is transitioned and displayed on the second portion at 518 or if the selected page is already displayed on the second portion at 516, existing application icons may be shifted if the selected application icon is inserted into an occupied position on the selected page at 520. If all positions are occupied on each page, subsequent to the shifting of the existing application icons at 520, a new page may be added to accommodate the shifted application icon(s) at 522.

The computing device may also be configured at 510 to detect whether the user has selected any of the application icons from either the first, second, or third portions of the GUI. For example, the user may decide to rearrange at least one application icon displayed on the first or second portion of the GUI. In another example, the user may decide to remove application icons from the pages displayed on the GUI. In one embodiment, the user may drag-and-drop at least one application icon to a position on at least one of the plurality of pages presented on the first portion or the second portion. Alternatively, the user may delete an application icon. If the application icon is inserted into an occupied position on one of the pages, the existing application icons may be shifted to accommodate the insertion of the application icon. Alternatively, if the application icon is removed from the page, the existing application icons may be shifted to fill and occupy the newly opened position. The computing device may also be configured to determine whether each position on each page is occupied. If so, a new page may be inserted after the final or last page to accommodate the shifted application icons subsequent to the insertion of the application icon.

Referring now to FIG. 5C, when the computing device detects that the user has not selected any other user selectable applications at 510 and when the decision 511 determines that the method 500 is done, the plurality of pages may be downloaded from the computing device to the PED at 526. In one embodiment, a replacement device data set may be sent to the PED. For example, a replacement device data set may be sent to the PED once the user selects the "Apply" control 280 illustrated in FIG. 2A-2D and FIG. 3. In one embodiment, the PED may not be in communication with the computing device. Thus, the replacement data set may be transmitted to the PED once it is determined that the PED is in communication with the computing device.

The replacement device data set may include device application data to identify application programs to be removed or added to the PED. The replacement device data set may also include arrangement data for each of the program icons provided on the PED. This ensures that the position or arrangement of each application icon on each of the plurality of pages is preserved during the download at 528. The arrangement of the program icons on the PED may be altered in the same manner and/or position as it was altered on the computing device.

Additionally, the replacement data set can also be stored, i.e., archived, on the computing device so that the application programs and the arrangement of the application icons for a PED can be maintained. Hence, if the PED loses its application or arrangement data for application programs, the PED could be connected to the computing device and the stored replacement data set could be accessed and used to return the PED to its archived state. Similarly, if the user obtains another PED (new, additional or associated with a common user account), the another PED could be connected to the computing device and the stored replacement data set could be accessed and used conform the another PED to a previously saved archived state.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer implemented method for arranging program icons on a portable electronic device (PED), the method comprising:

receiving, at a computing device, a device data set, the device data set including device application data to identify a plurality of application programs provided in the PED and arrangement data for the plurality of application programs provided in the PED;

displaying, in a first portion of a display device associated with the computing device, visual representations of each of a plurality of display screens, each of the plurality of display screens representing a corresponding display screen of the PED, the visual representations of the plurality of display screens including application icons from a second set of the plurality of application programs provided in the PED, the application icons from the second set arranged in the visual representations in accordance with the arrangement data;

displaying, in a second portion of the display device, a visual representation of a display screen for the PED, the visual representation including application icons from a first set of the plurality of application programs provided in the PED, the application icons from the first set arranged in the visual representation in accordance with the arrangement data;

permitting a user to interact with the application icons for the second set of the plurality of application programs to alter an arrangement of the application icons in the visual representations in the first portion and to add application icons to the visual representations in the first portion;

permitting the user to interact with the application icons for the first set of the plurality of application programs to alter an arrangement of the application icons in the visual representation in the second portion and to add application icons to the visual representation in the second portion; and     notifying the PED of the altered arrangement such that the PED is able to alter its arrangement of the one or more of the plurality of application programs provided on the PED in accordance with the altered arrangement and/or to add application programs corresponding to application icons added to the visual representation so that the application programs are provided in the PED.

2. The method of claim 1, further comprising:

displaying, on the display device associated with the computing device, a list of application programs on the computing device, wherein each of the application programs are usable by the PED and wherein at least one of the application programs are not provided on the PED, and allowing the user to add at least one of the application programs in the list of application programs to the PED by interacting with the visual representation; and allowing the user to add at least one of the application programs in the list of application programs to the PED by interacting with the visual representations.

3. The method of claim 2, wherein the visual representation, visual representations, and the list of application programs are concurrently displayed.

4. The method of claim 1, wherein the device data set further includes at least one application icon associated with each of the plurality of application programs.

5. The method of claim 1, wherein the permitting further comprises:

selecting at least one application icon; and dragging-and-dropping the selected application icon to reposition the selected application icon in the visual representation or the visual representations.

6. The method of claim 1, further comprising:

updating the visual representation as the user interacts with the visual representation to dynamically alter the application icons in the visual representation; and updating the visual representations as the user interacts with the visual representations to dynamically alter the application icons in the visual representations.

7. The method of claim 1, wherein the notifying further comprises:

sending a replacement data set to the PED, the replacement device data set includes replacement device application data to identify: (i) at least one application program to be provided or removed from the PED; and (ii) arrangement data for the application icon for each of the plurality of application programs provided on the PED.

8. The method of claim 1, further comprising:

displaying, in a third portion of the display device, a list of application programs provided on the computing device, wherein each of the application programs in the list are usable by the PED.

9. The method of claim 8, further comprising:

detecting a selection input for one of the at least application icons from the third portion;

detecting a screen selection input to insert the selected application icon into a selected one of the visual representations in the first portion; and updating the second portion to display the selected one of the visual representations.

10. The method of claim 1, wherein the displaying the second portion comprises displaying the visual representation in the second portion at a size that substantially corresponds to the size of the corresponding display screen on the PED.

11. The method of claim 10, wherein the displaying the first portion comprises:

displaying the plurality of visual representations at a size that is substantially smaller than the size of the corresponding display screen on the PED.

12. The method of claim 1, wherein the notifying the PED of the altered arrangement comprises:

producing, at the computing device, an updated data set based on the altered arrangement, the updated data set including at least updated arrangement data for the plurality of application programs provided in the PED; and providing the updated data set to the PED.

13. The method of claim 12, wherein the updated data set further includes updated device application data to identify a plurality of application programs provided in or to be provided in the PED.

14. A computing device comprising a memory and a graphical user interface (GUI) for a display of a computing device, the GUI comprising:

a first portion configured to display a plurality of display screens, each of the plurality of display screens including a plurality of application icons, wherein each of the plurality of display screens represents a corresponding display screen of a portable electronic device (PED) and wherein each of the plurality of application icons represent a corresponding application program stored on the PED;

a second portion configured to display one of the plurality of display screens from the first portion; and a third portion configured to display a list of user selectable applications that are resident on the computing device, wherein a user can select at least one of the user selectable applications to be transferred to the PED, and wherein each of the user selectable applications include a corresponding application icon;

wherein, based on the user selecting at least one of the user selectable applications and dragging a corresponding application icon from the third portion to one of the plurality of display screens in the first portion, the application icon is placed in the one of the plurality of display screens in the first portion, thereby altering an arrangement of the application icons in the one of the plurality of display screens in the first portion; and wherein, based on the user selecting at least one of the user selectable applications and dragging a corresponding application icon from the third portion to the one of the plurality of display screens in the second portion, the application icon is placed in the one of the plurality of display screens in the second portion, thereby altering an arrangement of the application icons in the one of the plurality of display screens in the second portion.

15. The device of claim 14, wherein the second portion is substantially larger than the first portion.

16. The device of claim 14, wherein the one of the plurality of display screens displayed in the second portion is presented at a size that substantially corresponds to the size of the corresponding display screen on the PED.

17. The device of claim 14, wherein at least one of the user selectable applications is not previously associated with one of the plurality of application programs stored on the PED.

18. The device of claim 14, wherein selecting at least one of the user selectable applications to be transferred and dragging the application icon from the third portion to the one of the plurality of display screens in the second portion comprises dragging and dropping the corresponding application icon from the list of user selectable applications displayed on the third portion into a user selectable position on the display screen displayed on the second portion.

19. The device of claim 18, wherein existing application icons on the display screen in the second portion shift when the user selectable position is occupied by an existing application icon.

20. The device of claim 19, wherein a new display screen is added to the first portion to accommodate the corresponding application icon if all user selectable positions are occupied on each of the plurality of display screens.

21. The device of claim 14, further comprising an interest indicator displayed on the third portion to allow the user to identify at least one of the user selectable applications, wherein each of the corresponding application icons associated with each of the identified user selectable applications of interest is inserted into the at least one display screen displayed on the first or second portion.

22. The device of claim 14, further comprising:
at least one personalized folder displayed on at least one of the plurality of display screens,
wherein at least one corresponding application icon is inserted or transferred into the at least one personalized folder.

23. A computer-implemented method to manage a plurality of applications on a portable electronic device (PED) using a computing device, comprising:
receiving a device data set from the PED to the computing device, the device data set including a plurality of display screens, each of the plurality of display screens including an application icon for each of the plurality of application programs operated on the PED, each of the application icons designated as being associated with one of the plurality of display screens;
presenting the plurality of display screens received from the PED on a first portion of a graphical user interface (GUI) of the computing device;
presenting a selected one of the plurality of display screens from the first portion on a second portion of the GUI, the selected display screen including a plurality of application icons;
presenting at least one user selectable application usable on the portable electronic device on a third portion of the GUI, wherein at least one of the user selectable applications is not previously associated with one of the plurality of application icons from the first portion;
based on the user selecting an application icon in the third portion that is associated with one of the user selectable applications in the third portion and dragging the application icon from the third portion to one of the plurality of display screens in the first portion, the application icon is placed in the one of the plurality of display screens in the first portion, thereby altering an arrangement of the application icons in the one of the plurality of display screens in the first portion;
based on the user selecting an application icon in the third portion that is associated with one of the user selectable applications in the third portion and dragging the application icon from the third portion to the one of the plurality of display screens in the second portion, the application icon is placed in the one of the plurality of display screens in the second portion, thereby altering an arrangement of the application icons in the one of the plurality of display screens in the second portion; and
subsequently transferring information concerning the plurality of display screens from the computing device to the portable electronic device, the information including at least position information for each of the application icons on each of the plurality of display screens during the downloading.

24. The method of claim 23, further comprising re-arranging at least one application icon displayed on the first portion or the second portion.

25. The method of claim 24, further comprising dragging-and-dropping the at least one re-arranged application icon to a user selectable position on a selected display screen on the first portion or the second portion.

26. The method of claim 25, further comprising transitioning the selected display screen from the first portion to the second portion.

27. The method of claim 25, further comprising:
determining whether each user selectable position on the at least one of the plurality of display screens are occupied; and
inserting a new display screen to accommodate the dragged-and-dropped application icon subsequent to the insertion of the dragged-and-dropped application icon into the selected page, if it is determined that each user selectable position on the plurality of display screens are occupied.

28. The method of claim 23, further comprising
creating at least one personalized folder;
displaying the personalized folder on at least one of the plurality of display screens; and
inserting the associated application icon into the least one personalized folder.

29. A non-transitory computer readable storage medium storing instructions that, when executed by a computer, cause the computer to perform a method comprising:
receiving a device data set, the device data set including device application data to identify a plurality of application programs provided in a PED and arrangement data for the plurality of application programs provided in the PED;
displaying, in a first portion of a display device, visual representations of each of a plurality of display screens, each of the plurality of display screens representing a corresponding display screen of the PED, the visual representations of the plurality of display screens including application icons from a second set of the plurality of application programs provided in the PED, the application icons arranged in the visual representations in accordance with the arrangement data;
displaying, in a second portion of the display device, a visual representation of a display screen for the PED, the visual representation including application icons from a first set of the plurality of application programs provided in the PED, the application icons arranged in the visual representation in accordance with the arrangement data;
permitting a user to interact with the application icons for the second set of the plurality of application programs to alter an arrangement of the application icons in the visual representations in the first portion and to add application icons to the visual representations in the first portion;
permitting the user to interact with the application icons for the first set of the plurality of application programs to alter an arrangement of the application icons in the visual representation in the second portion and to add application icons to the visual representation in the second portion; and
notifying the PED of the altered arrangement such that the PED is able to alter its arrangement of the one or more of the plurality of application programs provided on the PED in accordance with the altered arrangement and/or to add application programs corresponding to application icons added to the visual representation so that the application programs are provided in the PED.

* * * * *